United States Patent [19]
Delaunay

[11] 3,725,691
[45] Apr. 3, 1973

[54] ELECTRONIC DEVICES FOR FORMING ALGEBRAIC SUMS

[75] Inventor: Jacques Delaunay, St-Remy-Les-Chevreuses, France

[73] Assignee: Societe De Fabrication D'Instruments De Mesure SFIM, Ramolfo-Garnier, France

[22] Filed: July 16, 1971

[21] Appl. No.: 163,263

[30] Foreign Application Priority Data

July 17, 1970 France....................................7026471

[52] U.S. Cl......................................235/186, 33/224
[51] Int. Cl..........................G01c 17/38, G06g 7/22
[58] Field of Search....235/186, 189, 150.26, 150.27, 235/183; 33/204, 204 BA, 222 R, 222 A–E, 224, 225 A, 225 R, 226 R

[56] References Cited

UNITED STATES PATENTS

| | | | |
|---|---|---|---|
| 3,473,011 | 10/1969 | Schmid | 235/186 X |
| 3,482,086 | 12/1969 | Caswell | 235/186 |
| 3,541,853 | 11/1970 | Anderson | 33/225 R |
| 3,576,986 | 5/1971 | Brickner et al. | 235/186 X |
| 3,610,909 | 10/1971 | Jeppsson | 235/189 |

*Primary Examiner*—Joseph F. Ruggiero
*Attorney*—Brenner, O'Brien & Guay

[57] ABSTRACT

An electronic device is arranged to correct the angle A of gyroscopic heading for variations in the magnetic deviation angle $a$, thereby producing the angle $(A + a)$. A synchro transmitter generates a sin A and a cos A signal which are subsequently modulated by a modulator. The modulated signals are then integrated between two sets of limits each of which is a function of the angle $a$ and the operational frequency of the modulator. The relationship between the angle $a$ and operational frequency is such as to provide four output signals respectively representing various combinations of the product between different pairs of the functions sin A, cos A, sin $a$ and cos $a$. By appropriate summing in accordance with trigonametric equations, signals of sin $(A + a)$ and cos $(A + a)$ can be produced.

12 Claims, 5 Drawing Figures

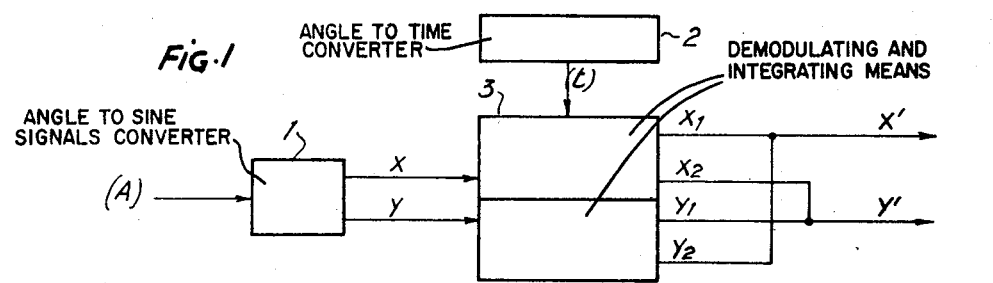
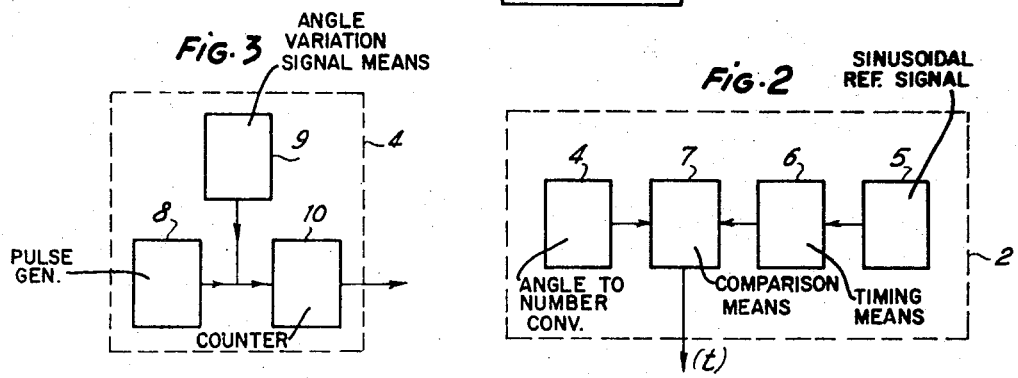
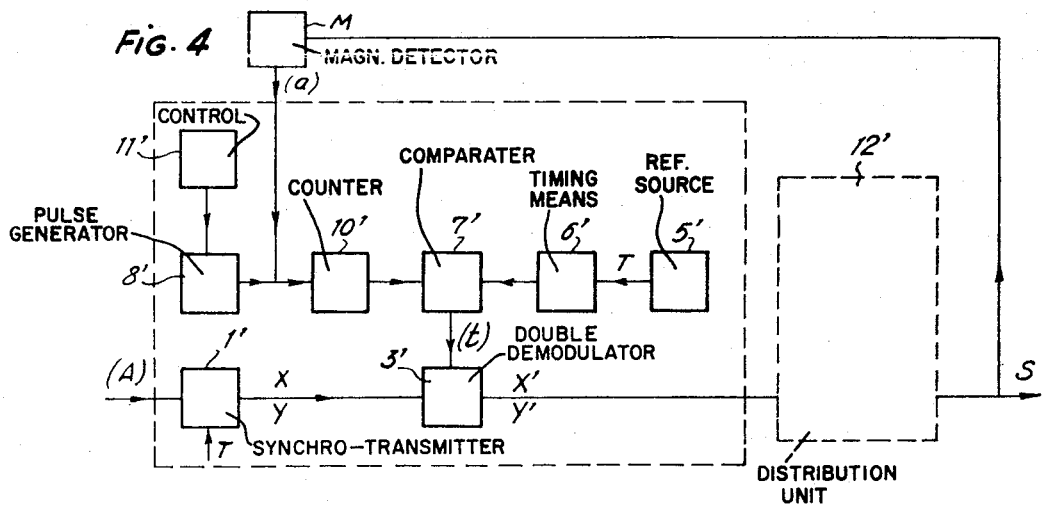
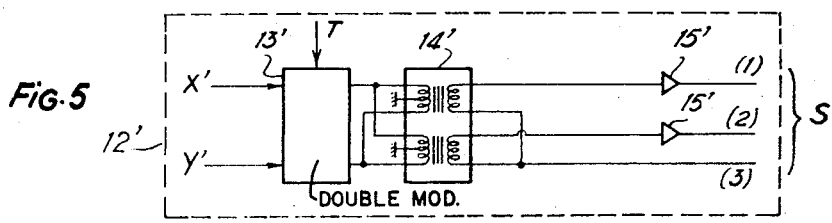

ELECTRONIC DEVICES FOR FORMING ALGEBRAIC SUMS

BACKGROUND OF THE INVENTION

1. Field of the Invention.

The invention relates to static electronic devices for forming the algebraic sum of two angles, primarily in order to correct the value of one of them, with particular reference to the correction of a gyroscopic heading in relation to a magnetic deviation, the device then being incorporated into a magnetic supervision device.

2. Description of the prior art.

Previously proposed devices for correcting a gyroscopic heading for variations in magnetic heading involve mainly electromechanical components such as synchros and the like to provide sine and cosine components of the corrected angle.

The disadvantages of such devices are that they are costly and perform their calculations relatively slowly.

It is an object of the present invention to provide an electronic device which largely replaces the function of the electromechanical components, is relatively cheap and operates relatively fast.

SUMMARY OF THE INVENTION

The present invention provides an electronic device for forming the algebraic sum of two variable angles (A and $a$), comprising first means for representing one (A) of the angles in the form of two modulated voltages, X and Y, such that:

$$X = U \sin A \sin (2\pi/T)t$$

$$Y = U \cos A \sin (2\pi/T)t$$

in which $U$ is a constant and $T$ the modulation period, second means for generating timing signals at instants $t_1, t_2, t_3$ and $t_4$, where $$t_1 = (a/2\pi)T$$

$$t_2 = t_1 + T/2$$

$$t_3 = t_1 + T/4$$

$$t_4 = t_1 + 3T/4$$

connected to the first and second means, means for integrating both said modulated voltages X and Y between the limits $t_1$ and $t_2$ and between the limits $t_3$ and $t_4$, the two integrals of the voltage X comprising voltages $X_1$ and $X_2$, and the two integrals of the voltage Y comprising voltages $Y_1$ and $Y_2$, and summing means connected to the integrating means for producing the sums $$X' = X_1 - Y_1$$

$$Y' = X_2 + Y_2$$

which are respectively sine and cosine functions of the angle $(A + a)$.

BRIEF DESCRIPTION OF THE DRAWINGS

An electronic angle summing device embodying the invention will now be described by way of example with reference to the accompanying diagrammatic drawings in which:

FIG. 1 is a block diagram of a static electronic device for forming the algebraic sum of two variable angles in accordance with the invention;

FIG. 2 is a block diagram of one form of equipment conforming to the invention for representing one of the angles in the form of time signals;

FIG. 3 is a block diagram of another piece of equipment conforming to the invention for representing one of the angles in numerical form;

FIG. 4 is a block diagram of a magnetic supervision device incorporating a correction unit consisting of a static electronic device such as here proposed; and FIG. 5 is a block diagram representing an enlargement of part of the device shown in FIG. 4.

DESCRIPTION OF THE PREFERRED EMBODIMENT

FIG. 1 is a block diagram of a static electronic device for forming the algebraic sum of two variable angles, A and $a$.

This device comprises:

a means of conversion 1, for representing one of the angles A, in the form of two modulated voltages, X and Y, such that $$X = U \sin A \sin (2\pi/T)t$$

$$Y = U \cos A \sin (2\pi/T)t$$

in which $U$ is a constant and $T$ the modulation period;

a means of conversion 2, for representing the other angle $a$, in the form of time signals $$t_1 = (a/2\pi)T$$

$$t_2 = t_1 + T/2$$

$$t_3 = t_1 + T/4$$

$$t_4 = t_1 + 3T/4$$

in which $T$ has the same meaning as before.

a means 3 for demodulating the said modulated voltages X and Y, and controlled by the time signals so as to effect the integration of each of those modulated voltages both during the interval $t_1-t_2$ and the interval $t_3-t_4$, the integrations of the voltage X supplying respectively the voltages:

$$X_1 = \int_{t_1}^{t_2} X \cdot dt = \frac{T}{\pi} U \sin A \cos a$$

$$X_2 = \int_{t_3}^{t_4} X \cdot dt = \frac{-T}{\pi} U \sin A \sin a$$

and the integrations of the voltage Y supplying respectively the voltages:

$$Y_1 = \int_{t_1}^{t_2} Y \cdot dt = \frac{T}{\pi} U \cos A \cos a$$

$$Y_2 = \int_{t_3}^{t_4} Y \cdot dt = -\frac{T}{\pi} U \cos A \sin a$$

and means of producing the sums $$X' = X_1 - Y_1 = (T/\pi) U \sin(A+a)$$

$$Y' = Y_1 + X_2 = (T/\pi) U \cos(A+a)$$

which are the components of the angle $A+a$.

The conversion means 1 may consists, for example, of a synchro-transmitter.

The conversion means 2 should consist of (see FIG. 2):

a means 4 of representing the angle $a$ in the form of a number proportional to $a$;

a means of reference 5 for producing a sinusoidal reference signal of period T;

a means of timing 6 for dividing each period of the reference signal into a number of impulses; and means of comparison 7 for receiving those impulses and comparing them with the number representing the angle $a$, the said time signals being produced as a result of this comparison.

In one embodiment of the invention, the means 4 for representing the angle $a$ in numerical form comprises (FIG. 3):

a pulse generator 8;

a means 9 for forming a sign signal representing the sign of variation of the angle $a$; and a counter 10 for receiving the pulses from the pulse generator and the sign signal, this counter producing the algebraic sum of the pulses in accordance with the sign signal, which sum constitutes the said number representing $a$. The counter incorporates a register in which this number is stored.

The demodulator 3 is a double demodulator, which receives the angle A in the form of its modulated components X and Y and carries out the requisite switching operations at the times $t_1$, $t_2$, $t_3$ and $t_4$ determined by the means of conversion in relation to the angle $a$.

Such a device, which enables the algebraic sum $A+a$ to be produced by purely static electronic means, has particular advantages for incorporation in a unit for the magnetic supervision of a gyroscopic heading.

The purpose of magnetic supervision units is to distribute headings based on the gyroscopic heading information given by a free directional gyroscope and on the magnetic deviation information given by a magnetic detector. According to their mode of operation, they distribute from the directional heading, the gyromagnetic heading or, as a standby, the magnetic heading reproduced directly from the magnetic detector without the intervention of the gyroscope.

They consist essentially of a correction unit capable of composing and storing a heading correction angle for addition to the gyroscopic heading, and a distribution unit providing a certain number of outputs. The magnetic detector, connected to one of those outputs, furnishes the magnetic heading deviation. The inputs and outputs are standard synchros.

In equipment of existing types, correction is obtained by the use of a servo-mechanism.

The arrangement illustrated provides a supervising device in which correction is provided by a static electronic device such as described above, in which A represents the gyroscope heading and $a$ the said deviation.

FIG. 4 is a diagrammatic representation of such a device for supervising a magnetic heading.

This device includes a double demodulator 3', which receives from a synchro-transmitter 1' the modulated components X and Y of the gyroscopic heading A and the control phase of which is representative of the correction angle $a$.

A reference source 5' provides a reference voltage, of the same period T (for example, T = 1/400) as the modulation period of the components of the gyroscopic heading, to a timing means 6', which divides each period into impulses — into 3,600 impulses for example.

These impulses are fed to a comparator 7' which compares their number to that supplied by a counter 10', in which are counted and registered pulses supplied by a pulse generator 8' which supplies the pulses to the counter accompanied by a sign governed by the sign of the magnetic deviation.

The result of the comparison is the production of signals for operating the demodulator at the times $t_1$, $t_2$, $t_3$ and $t_4$ already mentioned.

The signals determining the signs according to which the pulses are counted come from the magnetic detector M.

The magnetic detector receives an input signal representing the heading output S and supplies an output signal representing the magnetic deviation between that heading and the direction of the earth's magnetic field.

This output signal from the magnetic detector may be, for instance, a voltage, the amplitude of which is proportional to the deviation and the phase of which is of the sign of the deviation.

For example, the magnetic detector may be of the BEZU-SFIM type, in which the detector is a remote-reading compass consisting of two parallel permanent magnets fixed symmetrically to a vertical spindle; this assembly, when immersed in an electrolytic fluid, aligns itself according to the direction of the horizontal component of the earth's magnetic field and its direction in relation to the casing, which is fixed, is transmitted in electrical form through the agency of a toroidal potentiometer.

In accordance with one feature of the device illustrated, for reasons which will be explained later, the pulse generator 8' can send pulses at a frequency chosen from several possible frequencies and the device includes controls, 11', which enable that frequency to be selected by switching.

Finally, the device incorporates a distribution unit 12' which receives the corrected signals from the correction unit and supplies a corresponding gyroscopic heading signal to the magnetic detector and to one or more outputs.

In one recommended form of the invention, this distribution unit consists of static electronic means comprising (FIG. 5):

a double modulator 13' which receives the output voltages X' and Y' from the correction unit and converts them into modulated voltages X'' and Y'' of modulation period T;

a double transformer 14' which receives the modulated voltages and delivers by addition a corresponding signal having three components, 1, 2 and 3, at 120°; and amplifiers 15' which amplify each component and feed it both to the magnetic detector and to at least one output S of the device.

The magnetic supervising device here proposed can operate in various ways.

According to one mode of operation (rapid magnetic working), the pulse generator 8' sends pulses with a sign corresponding to the magnetic deviation and having a frequency corresponding to a rapid variation of $a$ between 10° and 50° per second and preferably between 15° and 25° per second.

According to another mode of operation (corrected directional working), the generator sends pulses at a frequency proportional to the sine of the latitude, the linking of the device to the magnetic detector M then being severed. The last angle figure registered in the counter before severance is consequently modified according to the latitude, and no longer to the magnetic deviation.

According to yet another mode of operation (normal gyro-magnetic working), the pulse generator sends pulses with a sign corresponding to the magnetic deviation and having a frequency corresponding to a slow variation of $a$ between 0.5° and 4° per minute and preferably between 1° and 2° per minute.

Finally, in the event of failure of the gyroscopic heading information, this information is replaced by an input voltage of constant amplitude modulated in T to simulate heading O and the generator sends pulses with a sign corresponding to the magnetic deviation at a frequency corresponding to a variation of the order of 20° per second in the heading angle.

What is claimed is:

1. An electronic device for forming the algebraic sum of two variable angles (A and $a$), comprising
    first means for representing one (A) of the angles in the form of two modulated voltages, X and Y, such that:

$$X = U \sin A \sin (2\pi/T)t$$

$$Y = U \cos A \sin (2\pi/T)t$$

in which $U$ is a constant and $T$ the modulation period; second means for generating timing signals at instants $t_1, t_2, t_3$ and $t_4$, where $$t_1 = (a/2\pi)T$$

$$t_2 = t_1 + T/2$$

$$t_3 = t_1 + T/4$$

$$t_4 = t_1 + 3T/4$$

means connected to the first and second means for integrating both said modulated voltages X and Y each between the limits $t_1$ and $t_2$ and between the limits $t_3$ and $t_4$, the two integrals of the voltage X comprising voltages $X_1$ and $X_2$, and summing means connected to the integrating means for producing the sums $$X' = X_1 - Y_1$$

$$Y' = X_2 + Y_2$$

which are respectively sine and cosine functions of the angle $(A + a)$.

2. A device according to claim 1, in which the second means comprises
    means for producing a signal whose value represents the numerical value of the angle $a$,
    reference means for generating a sinusoidal reference signal of period T,
    timing means connected to the reference means for dividing each cycle of the reference signal into a plurality of reference pulses, and
    comparing means connected to the timing means and the angle value producing means for comparing the number of reference pulses with the value of the signal representing the angle $a$.

3. A device according to claim 2, in which the second means comprises:
    a pulse generator operative to generate pulses numerically representative of each change in the magnitude of the angle $a$,
    means for generating a sign signal representing the sign of variation of the angle $a$,
    a counter connected to the pulse generator and the sign signal generating means, for receiving the pulses from the pulse generator and the said sign signal to cause the counter to store a number constituting the said signal representing the angle $a$.

4. A magnetic supervision device comprising a correction unit having a first input for receiving gyroscopic heading information and a second input for receiving magnetic detector information concerning heading deviation, the correction unit being operable to process the information received at the first and second inputs to provide an output signal representing the gyroscopic heading for angle of deviation, the correction unit comprising an electronic device according to claim 1, in which angle A represents the gyroscopic heading and angle $a$ the heading deviation.

5. A magnetic supervision device according to claim 4, in which the said second means of the electronic device comprises
    a pulse generator operative to generate pulses representative of each change in the magnitude of the angle $a$ and also to provide a sign signal representative of the sense in which the magnitude of angle $a$ changes,
    a counter connected to the pulse generator to receive the generated pulses and the sign signal, the counter summing the said pulses algebraically in accordance with the said sign signal,
    reference means operative to produce a reference signal having a period T and to divide each cycle of the reference signal into a plurality of reference pulses, and
    a comparator connected to the counter and the reference means to compare the result of the calculation effected in the counter with the number of pulses occurring during each cycle of the reference signal, the result of this comparison constituting the said timing signals.

6. A device as claimed in claim 5, in which the said pulse generator is selectively operable to generate pulses at a plurality of different discrete frequencies.

7. A device according to claim 6 in which the said pulse generator is operable to generate pulses at such a frequency as to communicate a change in the magnitude of the angle $a$ of between 10° and 50° in 1 second.

8. A device according to claim 6 in which the said pulse generator is operable to generate pulses at such a frequency as to communicate a change in the magnitude of the angle $a$ of between 15° and 20° in one second.

9. A device according to claim 7 in which the said pulse generator is also operable to generate pulses at such a frequency as to communicate a change in the magnitude of the angle $a$ of between 0.5° and 4° in 1 minute.

10. A device according to claim 8 in which the said pulse generator is also operable to generate pulses at such a frequency as to communicate a change in the magnitude of the angle $a$ of between 1° and 2° in 1 minute.

11. A device according to claim 5, in which the said pulse generator is operable to generate pulses at a frequency proportional to the sine of the latitude of the heading.

12. A device according to claim 4, including a modulator producing two carriers each having a period T and so connected to the summing means that the said output voltages X' and Y' modulate respective carriers, a transformer connected to the modulator to convert the two 90°-displaced modulated voltages X' and Y' into three output signals forming three components which are phase displaced by 120°, and three amplifiers connected to the transformer to respectively receive the three components and feed the three components to the magnetic detector.

* * * * *